Missing Page

Do Sonia

UNITED STATES PATENT OFFICE.

WILLIAM A. LIGHTHALL, OF ALBANY, NEW YORK.

IMPROVEMENT IN STEAM-ENGINES.

Specification forming part of Letters Patent No. 606, dated April 14, 1838; Reissue No. 21, dated July 18, 1840.

*To all whom it may concern:*

Be it known that I, WILLIAM A. LIGHTHALL, of the city and county of Albany, in the State of New York, have invented or made certain Improvements in Steam-Engines Intended for Propelling Vessels, which combined improvements I have designated as "Lighthall's Horizontal Beam Engine;" and I do hereby declare that the following is a full description of the same.

The following explanations refer to the Plate or Drawing No. 1 accompanying this specification: 4 4, the cylinder; A *a*, the working beam; B *b*, the connecting-rod; *c c c*, the crank and end of the shaft; E *e* E, the piston-rod and link to the lower end of the beam; H, the link to work the bell-crank; I I J, the link for working the air-pump; K K, the air pump and reservoir; L L L, the condenser and connection to the air-pump; M, the steam-pipe; M′, the side pipe; N, the exhaust-pipe to the condenser; O O, the valve-rods; P P, the eccentric wheel and rod; Q Q, the rock-shafts for working the valves; R R, the cut-off; T T, the keelsons; U, the center of crank motion; X, the center or fulcrum of the beam; Y, the pin or journal of the connecting-rod; X *b v*, lines showing the necessary bend or inclination of "beam," hereinafter spoken of.

To obviate many serious inconveniences and existing defects in the present form and disposition of the different parts of the steam-engine now in use, I have combined the leading characteristics of the beam-engine with those of the horizontal engine, in order to embrace the advantages of both, and at the same time avoid the difficulties and serious defects of either; and I accomplish the object in the following manner: I lay the cylinder 4 4 (or cylinders, if a double power be required) horizontally on or upon the keelsons T T, and place the working-beam A *a* at the proper distance in a vertical position with its lower end *a* at such a height as to range with the piston-rod E *e* in the same manner as when the working-beam is horizontal and the cylinder upright. If the length of the working-beam when thus vertically placed corresponds with the height of the shaft U, then the arrangement is completed and the desired object accomplished. To adapt the valves to this new position of cylinder I prefer placing the valve-chests and side pipes on the top of the cylinder and work the valve and lifting-rods at right angles to the cylinder, as shown in the drawings. But if the size of the wheel and other circumstances require the shaft C to be placed below the horizontal plane of the upper end of the working-beam, then it becomes necessary to bend or give a fixed inclination to the upper half or arm of the beam. To ascertain this bend or inclination I draw a line which in length is equal to the distance from the center of the beam to the center of the journal in the end of the beam. I draw said line from the fulcrum X of the beam to that point *b* where the central line of the connecting-rod would intersect it, which line shall be at right angles to a line drawn from the center of the shaft V to the said point of intersection. I lay down these lines, and thus find the necessary bend of beam and point of coupling with the connecting-rod by applying a "square" to my draft or drawing of engine.

The proper bend or inclination of the working-beam and the requisite length of "yoke," hereinafter described—that is, the proper positional relation between the center of beam vibration and the center of crank motion—can be obtained by other methods or rules equally as well known as that which I have adopted. Instead, however, of using a bent beam, it may be necessary, and even preferable, to use a straight working-beam already on hand. I then apply to the beam hanging vertically a yoke, *d d*, which forms the segment of a circle of which the upper arm of the working-beam X A is the radius, and said yoke is of such length as to remove the point of its coupling *d* with the connecting-rod *h h* so many degrees forward as it would otherwise be necessary to bend the beam. This yoke may be attached to any working-beam in a vertical position, and will be the same in effect as though the beam itself were bent to the angle required.

To secure the yoke in its place two strong braces, *d e*, are attached to each side of the upper arm of the working-beam—say about the center of its length—to the forward end of the yoke near or, as shown in the drawings, at its point of coupling *d* with the connecting-rod, which braces will give in all cases the necessary firmness. This yoke, when applied to a beam on hand, may be constructed in a variety of ways. I prefer constructing it as represented in Plate 2, Fig. I, which represents one portion, *d d*, of said yoke; and Fig. II represents both portions *d d d d* on each side of the end of the working-beam A, in which view or figure the braces are not seen or drawn, and in Fig. I only one of the braces *d e* is shown, which figure also represents the yoke *d d* and its brace *d e* as wrought together at their point of coupling with the connecting-rod *h h*, and is thus more solid and substantial than if the end of the brace were merely pinned to the yoke or connected with it and the connecting-rod by means of a journal passing through the end of the brace and yoke and thus connecting them with the connecting-rod. The yoke and brace being thus permanently wrought together at the point of coupling, and their other ends firmly keyed up on both sides of the working-beam to pins or journals passing through the beam, the yoke thus becomes, as it were, a part and parcel of the beam, and has all the necessary stability and firmness.

It is evident that instead of applying a detached or separate yoke to a beam or hands the beam and yoke may be wrought and cast together at the same time, thus giving to the upper end of the beam that variety of form which the different cases may require and the requisite degree of strength still preserved. The yoke is thus a substitute for the curved bent or deflected beam, and in connection or combination with the beam might be carried out to a greater extent, and then the upper half of the working-beam would form a quadrant or other segment or section of a circle or wheel.

The following explanations refer to Plate 2, accompanying this specification: A *a*, the working-beam; 4 4, the cylinder; M, the side pipe; *s s*, the valve-chests; W, the half-stroke or cut-off; L L L, the condenser, air-pump, and reservoir; I, the bell-crank; E, the piston-rod, and F, the link connecting it and the lower end of the beam; *d d e*, the yoke and brace; H, the connecting-rod for working the bell-crank; P P, the eccentric; U, the center of the shaft; T T, the keelsons.

For vessels of war or armed steamers, where it may be desirable to dispense with the whole beam and work in the place of it a half-beam, I then apply the yoke to the lower end of the said beam, hanging vertically and working it as a pendulum, and in such cases I consider it preferable to construct the yoke and beam together in one casting, having the usual strap of wrought-iron to give it the necessary strength, although the pendulum or half-beam may be cast or made separate and the yoke afterward attached, as when the whole beam and yoke are used.

The manner in which I construct, combine, and work the yoke and half-beam, or the whole beam bent to the required angle for the marine engine, will be more clearly understood by referring to Plate 3 and the following description: A B, the cylinder; C, the piston-rod; D E D, Fig. I, the bent beam; N, the connecting-rod for working the bell-crank; M M, the condenser and air-pump; K, the side pipe; L L, the rock-shaft; J J, the valve-rods; H H, the crank; T T, the keelsons; $D' D^2 D^3 D^4$, Fig. II, the half-beam and yoke made in one casting; K, Fig. III, the yoke attached to the half-beam.

From the foregoing description of the yoke and the bent beam it will appear that when the whole beam, partially bent, is worked, or its substitute, the yoke, that the motion or vibration of the beam thrown upon the shaft by the connecting-rod is from above downwards, and that when the half-beam and yoke are used or worked that the motion is reversed—that is to say, from below upward. The object and the effect of the yoke on the beam, more or less bent, or the half-beam and yoke, (which is virtually the whole beam bent until it forms the necessary angle,) is the same—that is, to adapt the vibrations of the beam to the required position or location of the shaft, or, as before stated, to make the center of the beam vibrations correspond with the center of crank motion.

It will appear by the improvement hereinbefore specified—the yoke—that the cylinder may in all cases be laid horizontally upon the keelsons, placing it and all the other machinery so low that its weight, instead of being, as it now is, an unavoidable encumbrance, will act in a great measure as judiciously-stowed ballast; that in vessels of war or armed steamers all the essential and vital parts of the machinery will be completely protected from an enemy's fire, and that the acting engineer can perform his duty not only with safety but with that self-possession which personal security would alone insure. It will also be observed that by the application of the yoke to either end of the beam, or by the bent beam in its various forms in boats calculated for shallow water, any length of stroke and diameter of wheel may be obtained, and with the cylinder placed horizontally and firmly attached to the keelsons and working the vertical beam and yoke in any of the forms before described there will be less jar and also less strain and injury to the vessel and engine than when the cylinder is raised or supported on the deck-beams or on a frame at a distance from the keelsons, or in any of the forms or position of engines now in use. Should additional power be required, two cylinders similarly placed on opposite sides of the beam in line with each other might be worked upon the same beam, or one could be doing the work while the other was undergoing repairs, especially desirable in vessels navigating the ocean.

The arrangement of the essential improvements having been described and set forth, it is thought unnecessary to specify in detail the slight variations that might be required or deemed expedient to be made in the relative disposition or situation of the different parts of the engine. The air pump and condenser, for instance, may be placed wherever it may be deemed most expedient and convenient to work the same. The valves and side pipes may be on the top or the bottom or the sides of the cylinder, &c. Such changes may be made in a variety of ways, and would naturally suggest themselves to an engineer or any person at all skilled or acquainted with the subject.

In this specification I claim as my original discovery or improvement—

1. Working the beam vertically, in combination with the horizontal cylinder.

2. The relative and combined disposition or arrangement of the cylinder, the beam working vertically with it and the crank, to wit: the cylinder lying horizontally on or upon the keelsons, at right angles to the lower end of the vertical working-beam, while the upper end of said beam is connected with, and by means of the shackle-bar gives motion to, the crank upon the shaft.

3. The curved or bent working-beam, the lower portion of said beam working vertically, like a pendulum, while the upper or crank portion works or vibrates in accordance with the required position of the shaft and crank, said beam thus working in combination with the horizontal cylinder and crank in their relative and combined disposition, as hereinbefore intended to be described.

4. To avoid bending the working-beam or using a bent beam in cases in which it is necessary or desirable to place the shaft below the horizontal plane of the upper end of the working-beam, the yoke hereinbefore specified, in combination and connection with the vertical working-beam, and also in combination with the horizontal cylinder.

5. To dispense with the upper half of the working-beam, the yoke, as hereinbefore shown and described, in combination and connection with the lower end of the half-beam working vertically as a pendulum, and also its substitute, the bent beam, in combination with the horizontal cylinder and the crank working at the required position or distance above the horizontal plane of the lower end of the said beam.

May 14, 1840.

WILLIAM A. LIGHTHALL.

In presence of—

GEO. W. MORTON,

HAMILTON MORTON.